United States Patent [19]

Moriyama et al.

[11] 4,045,141
[45] Aug. 30, 1977

[54] PHOTOELECTRIC MICROSCOPE

[75] Inventors: Shigeo Moriyama; Yoshio Kawamura, both of Kokubunji, Japan

[73] Assignee: Hitachi, Ltd., Japan

[21] Appl. No.: 695,556

[22] Filed: June 14, 1976

[30] Foreign Application Priority Data

June 13, 1975 Japan .................................. 50-71500
Apr. 2, 1976 Japan .................................. 51-36003

[51] Int. Cl.$^2$ ............................................. G01B 9/04
[52] U.S. Cl. .................................. 356/156; 356/167; 356/172
[58] Field of Search ................ 250/201; 356/156, 167, 356/170, 172

[56] References Cited

U.S. PATENT DOCUMENTS

| | | | |
|---|---|---|---|
| 3,038,369 | 6/1962 | Davis | 250/201 |
| 3,565,532 | 2/1971 | Heitmann et al. | 356/170 |
| 3,592,545 | 7/1971 | Paine | 356/167 |
| 3,876,311 | 4/1975 | Sasayama | 356/167 |

FOREIGN PATENT DOCUMENTS 1,358,363  3/1964  France ................................. 350/203

Primary Examiner—John K. Corbin
Attorney, Agent, or Firm—Craig & Antonelli

[57] ABSTRACT

Description is made of improvements in a photoelectric microscope which is employed for the measurement of a very small distance. According to this invention, an optical system for making point-symmetric images is disposed in an optical path of an objective of a photoelectric microscope so as to form on an identical focal plane a pair of (two) images of a reference line (or mark) on a test piece which are in the relation of point symmetry to each other, and the distance between the pair of (two) images is measured, whereby the deviating distance of the reference line (or mark) on the test piece from the optic axis of the objective is evaluated. The distance between the pair of images is evaluated by gauging the time difference between two detection signals which are obtained by scanning the pair of images at equal speeds with photoelectric detectors.

12 Claims, 6 Drawing Figures

PHOTOELECTRIC MICROSCOPE

BACKGROUND OF THE INVENTION

1. Field of the Invention

This invention relates to improvements in a photoelectric microscope which is employed for the measurement of a very small distance. More particularly, it relates to a photoelectric microscope which is so improved that the position of a reference line (or mark) provided on the surface of a test piece (sample) can be measured with high precision as a distance from the optic axis of an optical system for measurement.

2. Description of the Prior Art

It is well known that photoelectric microscopes of various types are employed for the purpose of measuring very small distances in the micron to submicron order. For example, the photoelectric microscope of the vibration slit type acquires a signal indicative of the position of a reference line, that is, indicative of the distance from the optic axis of a measuring optical system to the reference line, in such a way that the image of the reference line provided on the surface of a test piece is formed on a vibrating slit plate by an objective. That light passing through the slit plate is then detected by a photoelectric transducer which is disposed behind the slit plate, and the detected signal is synchronously rectified by a driving signal for the vibrating slit plate.

In the prior art apparatus of this sort, however, when the vibration center of the vibrating slit plate deviates or when the distribution of the intensity of illumination around the reference line on the test piece is not a prefect line-symmetric distribution, a measurement error arises. When the contrast of the reference line on the test piece changes, the detection sensitivity fluctuates, resulting in a further measurement error.

SUMMARY OF THE INVENTION

It is accordingly an object of this invention to provide a photoelectric microscope which can more precisely measure the position of a reference line provided on the surface of a test piece.

Another object of this invention is to provide a photoelectric microscope of the vibrating slit type which is so improved that even when the vibration center of a vibrating slit deviates, the measurement precision is not affected.

Still another object of this invention is to provide a photoelectric microscope which is so improved that measurement error is not caused by a change in the contrast of a reference line or an asymmetry in the distribution of the intensity of illumination around the reference line.

In order to accomplish the various objects, according to this invention, an optical system for making point-symmetric images is disposed in an optical path of an objective of the photoelectric microscope so as to form on an identical focal plane of a pair of (two) images of a reference line (or mark) on a test piece which are in the relation of point symmetry to each other, and the distance between the pair of (two) images is measured, whereby the distance of the reference line on the test piece from an optic axis is evaluated.

As the optical system for making point-symmetric images, there can be used one well known in itself, for example, a combined structure of prisms commonly known as a double prism. The distance between the two images can be evaluated, for example, from the time difference between two detection signals, which are obtained by scanning the two images relative to photoelectric detectors, and from the scanning speed.

In accordance with such characterizing construction of this invention, the deviation of the reference line from the optic axis is measured as the distance between the two images of the reference line. Unlike the prior art, therefore, the lowering of the measurement accuracy ascribable to the deviation of the vibration center of the vibrating slit does not arise at all.

DESCRIPTION OF THE PREFERRED EMBODIMENTS

Figure 1:
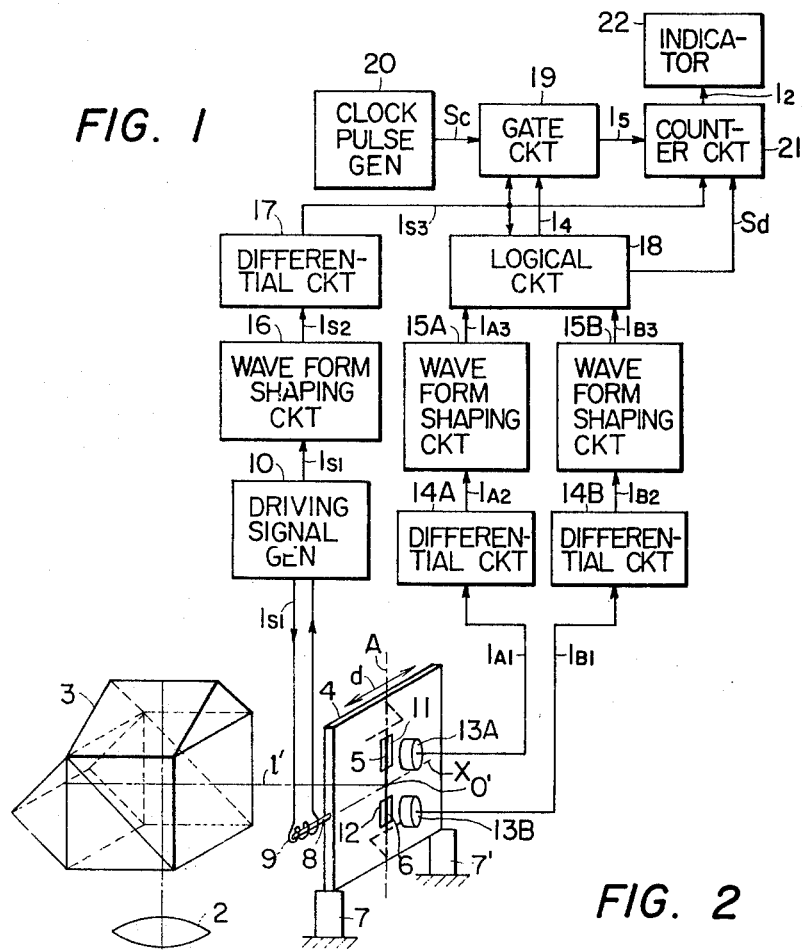
FIGS. 1 and 4 are schematic block diagrams each showing the configuration of an embodiment of this invention.

FIG. 1 shows the schematic construction of a photoelectric microscope embodying this invention. Referring to the figure, a test piece W is provided with a reference line (mark) 1 on a surface thereof for positioning the piece. Shown at 2 is an objective lens. Numeral 3 designates a well-known optical system 3 for making point-symmetric images, the optical system being generally referred to as a double prism.

The positioning reference line (mark) 1 is focused into a pair of (two) images 5 and 6, which are in the relation of point symmetry to each other, on a slit plate 4 through the objective lens 2 and the double prism 3. Here, 1 and 1' indicate the optical axes of the optical system, and 0 and 0' indicate the points of intersection between the optical axis 1 and the test piece W and between the optical axis 1' and the slit plate 4, respectively.

Figure 2:
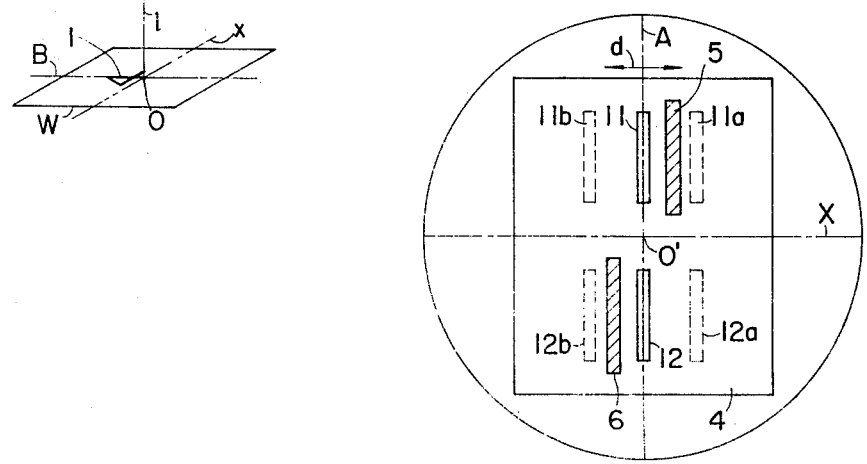
FIG. 2 is a diagram for elucidating the principle of operation of a photoelectric microscope according to this invention.

Now, consider a straight line B which passes through the point 0 on the test piece W. Let it be supposed that the straight line B is focused as a straight line A passing through the point 0' on the slit plate. In actuality, the straight lines B and A are uniquely determined by the construction of the optical system. When the reference line 1 lies exactly on the straight line B on the test piece W, both the images 5 and 6 come to lie on the straight line A on the slit plate 4. On the other hand, when the reference line 1 deviates from the straight line B by $+\Delta x$ in a direction orthogonal thereto (in the x-direction), the situation is as illustrated in FIG. 2, and the images 5 and 6 deviate from the straight line A by $+\Delta X$ and $-\Delta X$ in a direction orthogonal thereto (in the X-direction), respectively. Here, the relationship of $\Delta X = K \cdot \Delta x$ holds (where $K$ denotes the magnification of the objective lens 2), and the distance D in the X-direction between the image 5 and the image 6 becomes $D = 2 \cdot \Delta X = 2 K \cdot \Delta x$. By measuring the distance D between the images 5 and 6, accordingly, the amount of deviation $\Delta x$ of the reference line 1 from the straight line B can be evaluated on the basis of the relation $\Delta x = (D/2K)$. In addition, the direction of the deviation of the reference line 1 from the straight line B can be determined from the directions of the deviations of the images 5 and 6 with respect to the straight line A.

In order to automatically measure the distance D between the images 5 and 6, the embodiment of FIG. 1 is constructed as stated below. In the slit plate 4, two slit openings 11 and 12 are juxtaposed in alignment with the direction of the straight line A. The slit plate 4 is supported by a pair of parallel springs 7 and 7' in a manner to be capable of only a translational motion in the X-direction. A permanent magnet 8 is mounted on the slit plate 4 at its one end in the X-direction. Accordingly, the slit plate 4 is sinusoidally vibrated within a range of a very small distance $d$ in the X-direction in such a way that a sinusoidal current from a driving signal generator (for example, a low-frequency sinusoidal wave oscillator) 10 is caused to flow through an exciting coil 9.

First, the test piece W is positioned by movement about the optical axis 1 of the objective lens 2. Thus, adjustment is performed so that the images 5 and 6 of the reference line 1 on the slit plate 4 may become parallel to the straight line A as depicted in FIG. 2. At this time, the reference line 1 on the test piece W becomes parallel to the straight line B. As previously stated, in response to the deviation $+ \Delta x$ or $- \Delta x$ of the reference line 1 from the straight line B, the images 5 and 6 on the slit plate 4 deviate from the straight line A by $\pm \Delta X$ or by $\pm \Delta X$, respectively.

In vibrating the slit plate 4, the amplitude $d$ is selected to be greater than the distance $2 \Delta X$ between the two images 5 and 6 so that, as indicated in FIG. 2, the slit openings 11, 12 may be moved from positions sufficiently apart rightwards from the image 5 as shown at 11a, 12a to positions sufficiently apart leftwards from the image 6 as shown at 11b, 12b. The center of vibration of the slit plate 4 need not always lie on the straight line A.

The relative scanning between the images 5, 6 of the reference line and the slit openings 11, 12 is effected by the vibration of the slit plate 4 as described above. When the respective openings 11 and 12 come to the image formation positions of the reference line images 5 and 6, the quantities of light passing through the openings change. The light quantity changes are detected and delivered as electric signals by photoelectric detectors 13A and 13B.

Figure 3:
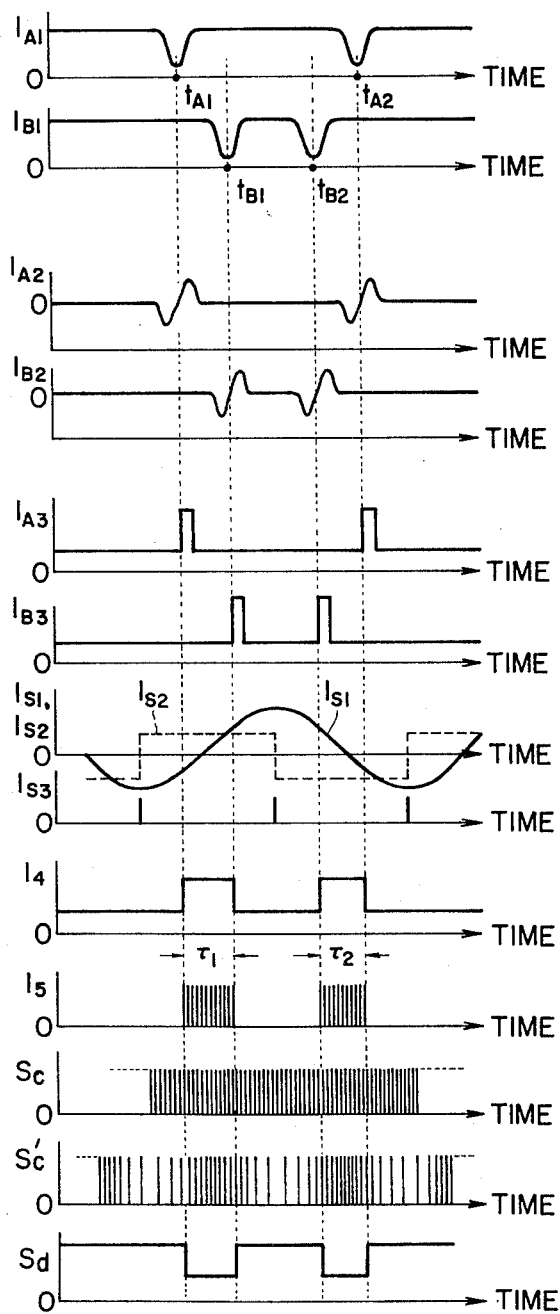
FIG. 3 is a signal waveform diagram for elucidating the operations of the embodiments illustrates in FIGS. 1 and 4.

Assuming here that the reference line images 5 and 6 are dark area and that a region surrounding them is a bright area, the output signals provided from the photoelectric detectors 13A and 13B become, by way of example, as shown at $I_{A1}$ and $I_{B1}$ in FIG. 3. While the slit openings 11, 12 move from the positions 11a, 12a to the positions 11b, 12b as illustrated in FIG. 2, firstly the output signal $I_{A1}$ of the photoelectric detector 13A lowers sharply at a time $t_{A1}$, and then the output signal $I_{B1}$ of the photoelectric detector 13B lowers sharply at a time $t_{B1}$. While the slit openings 11, 12 subsequently move in the opposite direction, firstly the output signal $I_{B1}$ lowers sharply at a time $t_{B2}$, and then the output signal $I_{A1}$ lowers sharply at a time $t_{A2}$.

Here, let $\tau_1$ denote the time difference between the times $t_{A1}$ and $t_{B1}$ and $\tau_2$ denote the time difference between the times $t_{B2}$ and $t_{A2}$. When the distances by which the slit plate 4 has moved within the time differences $\tau_1$ and $\tau_2$ are evaluated, they correspond to the X-direction distance between the images 5 and 6. Further, the amount of deviation of the reference line 1 from the straight line B on the test piece W is evaluated from the X-direction distance.

Referring again to FIG. 1, the output signals $I_{A1}$ and $I_{B1}$ from the detectors 13A and 13B are differentiated by differentiation circuits 14A and 14B and become signals $I_{A2}$ and $I_{B2}$, respectively. Subsequently, the respective signals $I_{A2}$ and $I_{B2}$ have only their positive side signals shaped by waveform shaping circuits (for example, Schmitt trigger circuits) 15A and 15B and become signals $I_{A3}$ and $I_{B3}$. Both the signals $I_{A3}$ and $I_{B3}$ are fed to a logical circuit 18.

The logical circuit 18 operates according to a logic wherein a gate circuit 19 is opened by the first one of the signals $I_{A3}$ and $I_{B3}$ received and the gate circuit 19 is closed by the succeeding signal. The output of the logical circuit 18 is a gate signal $I_4$. In this case, the direction of deviation of the reference line is discriminated by the logical circuit 18 as being positive when the gate is opened by the signal $I_{A3}$ and as being negative when it is opened by the signal $I_{B3}$ (quite the opposite signs apply for the returning stroke of the slit plate 4). A discriminating signal (1 or 0 signal) $S_d$ is fed to a counter circuit 21 indicating this direction of deviation.

On the other hand, a low-frequency sinusoidal wave output signal $I_{S1}$ of the driving signal generator 10 is differentiated and has its waveform shaped by a waveform shaping circuit 16 and becomes a signal $I_{S2}$. Subsequently, the signal $I_{S2}$ is turned into reset pulses $I_{S3}$ by a differentiation circuit 17. The reset pulses $I_{S3}$ reset the gate circuit 19 at every half cycle of the sinusoidal wave output signal $I_{S1}$, and serve to control the timing of the opening and closure of the gate.

A train of pulses $S_c$ at regular intervals as provided from a clock pulse generator 20 are fed to the counter circuit 21 and counted as a group of pulses $I_5$ only for the period during which the foregoing gate circuit 19 is open. Further, the direction of deviation is discriminated by the sign discriminating signal $S_d$ from the logical circuit 18. A signal $I_2$ which represents the count value and the direction of deviation is fed to an indicator circuit 22, in which the amount of deviation and the direction of deviation of the reference line 1 are finally indicated.

Since the scanning rate of the slit plate 4 is sinusoidal, the amount of deviation of the reference line 1 from the straight line B as thus detected is not precisely proportional to the actual amount of deviation. In order to solve this problem, the slit plate 4 may be vibrated in the form of triangular waves so as to scan the reference line images at a uniform speed. As an alternative measure, instead of vibrating the slit plate 4, the images may be scanned by openings which are provided in a slit disk executing a uniform rotational motion.

As apparent from the above explanation, according to this invention, equivalently the reference line images are scanned at an identical speed in such a manner that the two openings hold the images therebetween from sides opposite to each other. Therefore, when both the edges of the reference line in the width direction are simultaneously detected, the detection is that of the center of the reference line. Thus, even if there are a plurality of reference lines, the central part thereof can be detected. According to this invention, the differential processing can be conducted merely by catching the brightness changes of only the respective edge parts of the reference line as described previously. Therefore, even if the edge parts or the surrounding region of the reference line have different brightnesses on right and left sides, neither a detection error nor a change in the detection sensitivity will arise.

As already stated, while the driving signal $I_{S1}$ of the slit plate 4 is described as a sinusoidal signal in the embodiment of FIG. 1, the moving speed of the slit plate 4 is not strictly constant. In that case, therefore, even when the detection time difference between the reference line images 5 and 6 (the period of time during which the gate circuit 19 is open) is measured by counting the clock pulses at regular intervals as pass through the gate circuit 19 during the period, the measurement is not an accurate one of the distance between the reference line images 5 and 6, and it involves some measurement error. In order to solve this problem, the actual distance of movement of the slit plate 4 during the opening of the gate circuit 19 may be measured.

Figure 4:
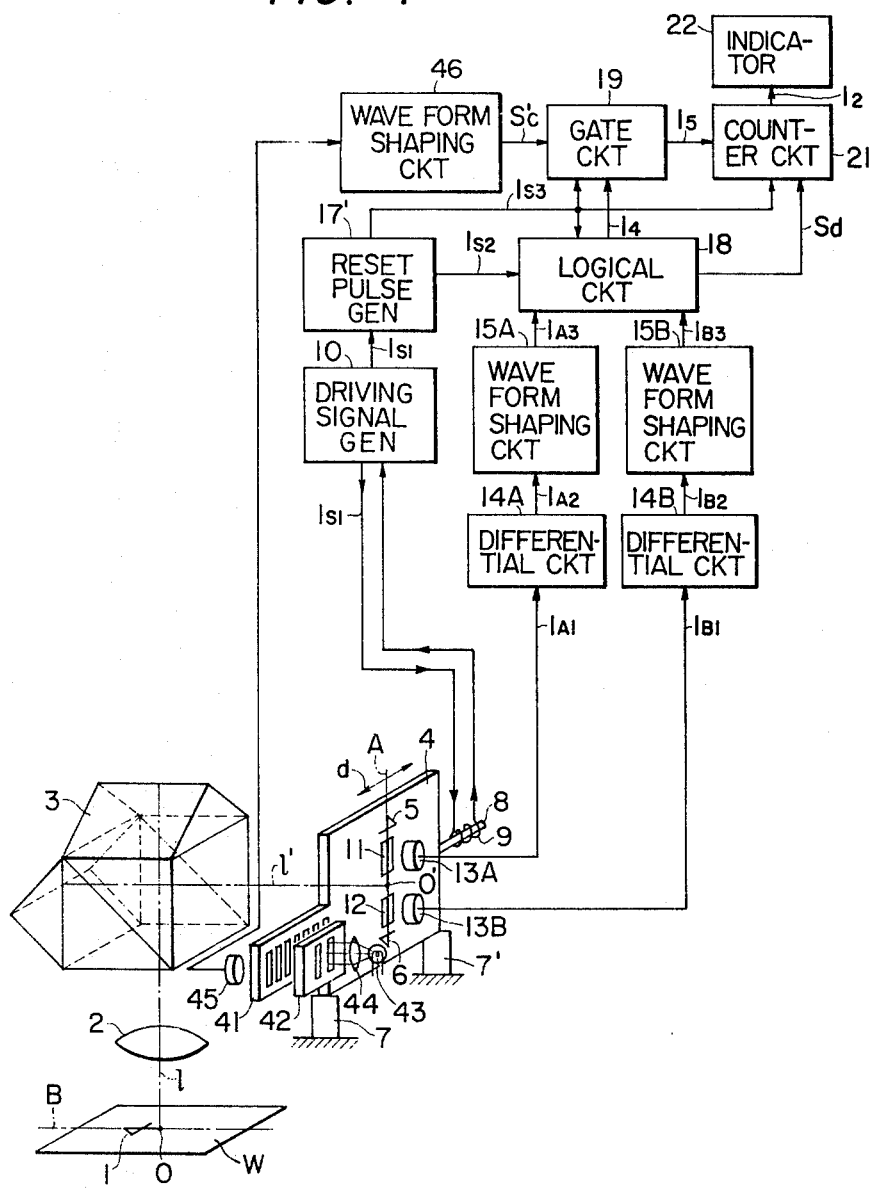

FIG. 4 shows another embodiment of this invention wherein the actual distance of movement of the slit plate is measured in such a manner. In this embodiment, a movable scale 41 is mounted on the slit plate 4 integrally therewith. The slit plate 4 and the movable scale 41 are sinusoidally vibrated by the sinusoidal wave output signal from the driving signal generator 10.

The movable scale 41 is a grating in which a large number of rectangular openings are arranged at equal intervals. It is fabricated in such a way that chromium or the like is deposited onto a glass substrate by vacuum evaporation, whereupon the resultant glass substrate is subjected to photoetching which is employed in the known IC manufacturing process, etc. The scale 41 is secured to the slit plate 4. A stationary scale 42 is situated in opposition to the movable scale 41. Also, the stationary scale 42 has at least one rectangular opening. Both the scales are illuminated by a collimated beam which is obtained by a light source 43 and a condenser lens 44. When, with such arrangement, the movable scale 41 is displaced along with the slit plate 4, the illumination light intermittently falls on a light receptor 45 and is converted into an electric signal. Pulses conforming with the intensity of the electric signal appear at the rate of one to each pitch of the openings of the movable scale 41 (i.e., to each unit distance of movement of the slit plate 4). The pulsating electric signal has its waveform shaped into the form of pulses of small width by a waveform shaping circuit 46 and becomes a train of pulses $S_c'$ as shown in FIG. 3. The train of pulses $S_c'$ is applied to the gate circuit 19.

As apparent from the construction described above, the signal $S_c'$ provides a pulse at every unit movement distance of the slit plate 4. Accordingly, when the number of the pulses passing through the gate 19 during the period of the opening thereof is counted, the count value corresponds precisely to the distance between the reference line images 5 and 6.

The remaining circuit arrangement in FIG. 4 is quite the same as in FIG. 1, and hence explanation thereof is omitted. A reset pulse generator 17' in FIG. 4 is endowed with both the functions of the waveform shaping circuit 16 and the differentiation circuit 17 in FIG. 1.

Figure 5:
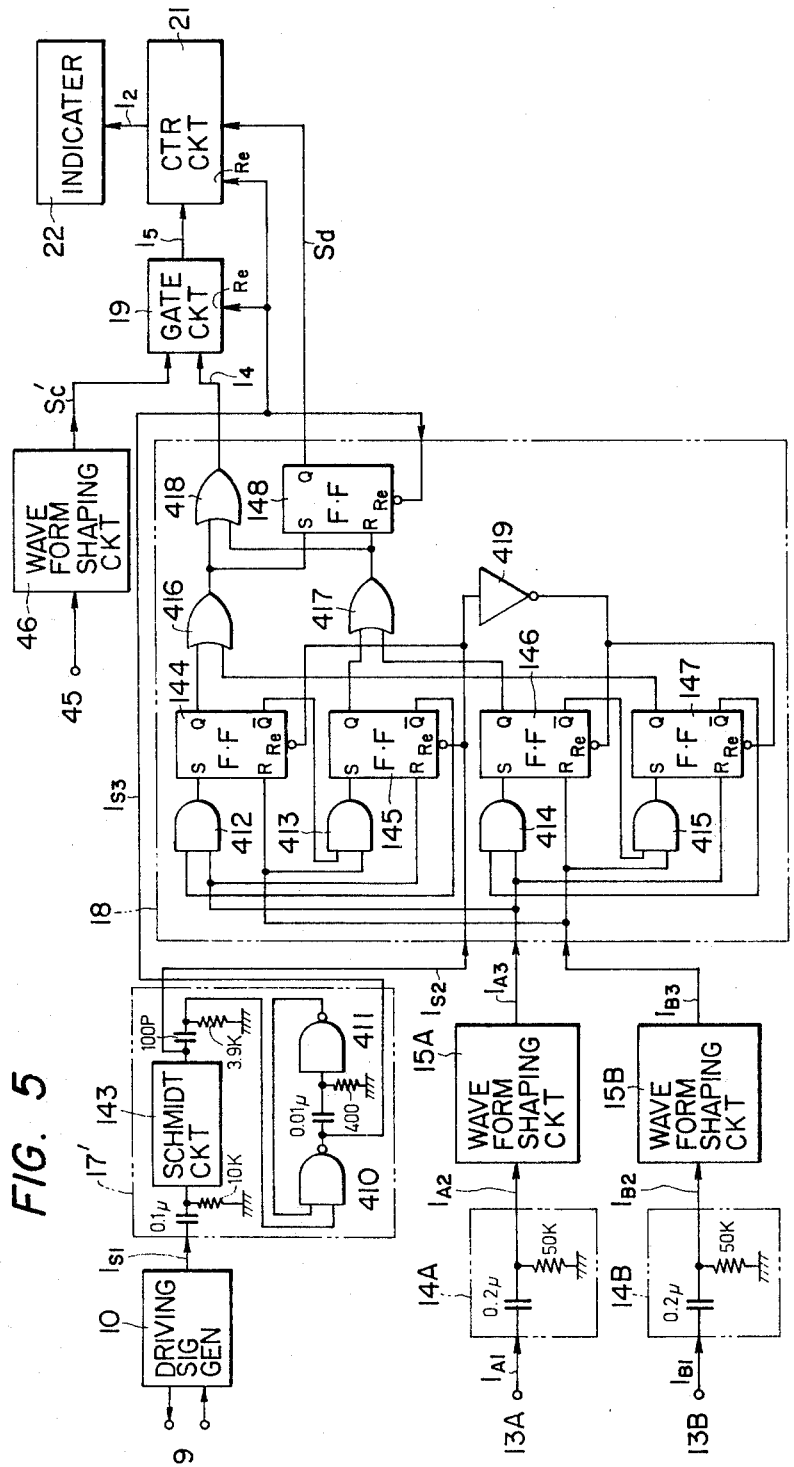
FIG. 5 is a schematic circuit diagram showing an example of a specific circuit arrangement of the embodiment illustrated in FIG. 4.

An example of a specific circuit arrangement of the logical circuit 18 in the embodiment of FIG. 4 is shown in FIG. 5. Needless to say, the logical circuit 18 in the embodiment of FIG. 1 can be constructed quite similarly.

Referring to FIG. 5, numerals 410 and 411 designate NAND circuits, numerals 412 - 415 AND circuits, numerals 416 - 418 OR circuits, and numeral 419 an inverter circuit. Numerals 144 -148 represent R-S flip-flop circuits, the truth table of which is as given by Table 1.

TABLE 1

| S | R | $Q_{t+1}$ | $\overline{Q_{t+1}}$ |
|---|---|---|---|
| 0 | 0 | $Q_t$ | $\overline{Q_t}$ |
| 1 | 0 | 1 | 0 |
| 0 | 1 | 0 | 1 |
| 1 | 1 | indeterminate | |

In each of the flip-flop circuits, $R_e$ denotes a clear terminal. Numerals 141 and 142 designate Schmitt trigger circuits.

The output signal $I_{S1}$ of the driving signals generator 10 vibrates the slit plate 4. Simultaneously therewith, it is subjected to differentiation and waveform shaping by the reset pulse generator 17', which includes the Schmitt trigger circuit 143, and becomes the signal $I_{S2}$. Subsequently, the signal $I_{S2}$ is differentiated to provide the reset pulses $I_{S3}$. The reset pulse resets the flip-flop circuit 148 of the logical circuit 18 and the counter circuit 21 as well as the gate circuit 19. The train of pulses $S_c'$ produced by the movable scale 41 and the photoelectric conversion system thereof is fed to the counter circuit 21 only during the period during which the gate circuit 19 is open, and the pulses are counted as the group of pulses $I_5$. Further, the direction of deviation is discriminated by the sign discriminating signal $S_d$ from a terminal Q of the flip-flop 148 of the logical circuit 18. By way of example, the positive or negative sense of the deviation is discriminated by taking the logical product between the sign discriminating signal $S_d$ and the gate signal $I_4$. The signal $I_2$ representative of the count value with the sign discriminated is transmitted to the indicator circuit 22, so that the amount of deviation of the reference line 1 from the straight line B and the direction of deviation thereof are indicated.

The numerical value obtained in the indicator circuit 22 in this way denotes the amount of deviation of the central position of the reference line 1 from the straight line B. Assuming now that the magnification of the objective 2 is 50, the distance in the vibrating direction of the slit plate 4 (X-direction) between the point-symmetric images 5 and 6 of the reference line 1 projected on the slit plate 4 becomes 100 times the actual amount of deviation of the reference line 1 from the straight line B. Therefore, assuming the pitch of the openings of the movable scale to be 5 μm, the unit of the numerical value obtained in the indicator circuit 22 becomes 5/100 μm, and the position of the reference line can be measured with a very high precision.

As apparent from the above explanation, according to the embodiment shown in FIG. 4, equivalently the reference line images are scanned in such a manner that the two openings hold them therebetween from both sides. Therefore, the central position of the reference line can be accurately detected. Besides, the amount of deviation of the central position of the reference line from the optic axis is evaluated from the actual scanning distance of the two openings. Therefore, an accurate measurement of the amount of deviation is always possible without being influenced by a fluctuation in the scanning speed of the openings, i.e., the scanning speed of the slit plate. In addition, the measurement precision does not depend upon the scanning speed of the slit plate, so that the vibration scanning range of the slit plate can be made wide.

Figure 6:
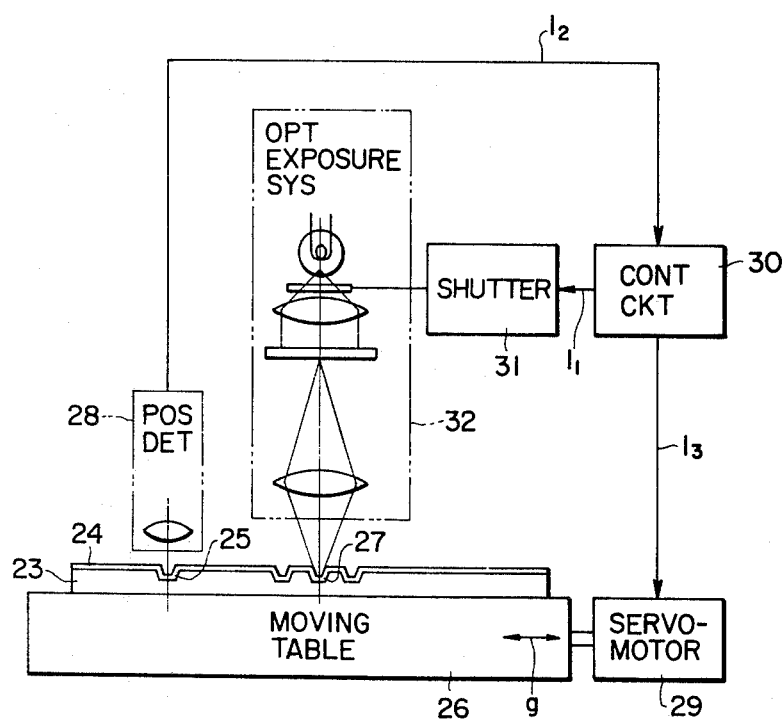
FIG. 6 is a schematic diagram showing an example of the photoelectric microscope according to this invention.

Owing to these features, the photoelectric microscope of this invention can be effectively applied to the positioning of a wafer, which is one step of a process for manufacturing an integrated circuit. FIG. 6 shows an example of such application.

The figure depicts exposure apparatus for precisely printing a new pattern onto a pattern on a wafer of an integrated circuit as processed by the preceding step. The apparatus operates as stated below.

A wafer 23 coated with a sensitive material 24 is attached on a moving table 26. A position detector 28 measures the position of a reference line or a registration mark 25 on the wafer 23, and sends a position signal $I_2$ to a control circuit 30. In response to the position signal $I_2$, the control circuit 30 sends a driving signal $I_3$ to a servomotor 29. Then, the moving table 26 is moved to position the wafer 23 at a predetermined location. Upon completion of the positioning, the control circuit 30 provides a signal $I_1$ to open a shutter 31. An optical exposure system 32 prints a new pattern doubly onto a pattern 27 formed by the preceding step. In this case, problems are the position detecting accuracy and the detecting range of the position detector 28. Each time the wafer 23 undergoes a step, the shape of the registration mark 25 as optically seen changes little by little. Therefore, position detecting means of the prior art has been prone to cause a measurement error. In contrast, the photoelectric microscope according to this invention can precisely find the central position of the registration mark. Therefore, by employing it as the position detector 28, a highly accurate position detection is enabled without being influenced by the optical changes in shape of the registration mark. In addition, the detecting range can be rendered wide. It is therefore possible to set a wide allowable attachment range in case of attaching the wafer 23 onto the moving table 26.

As set forth above, according to this invention, the positional detection of the central part of the reference line is possible with high precision. The invention is applicable to a mask aligner, a coordinate measuring instrument, etc., besides the foregoing example of application, and is greatly effective.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A photoelectric microscope, for use in positioning a test piece having a reference line provided thereon, comprising
    optical means for forming on an identical focal plane a pair of magnified images of said reference line in point symmetry relationship to each other, and
    distance measuring means for automatically measuring the distance between said pair of magnified images on said focal plane.

2. A photoelectric microscope as defined in claim 1, wherein said optical means includes an objective lens and a double prism having first and second orthogonal optical axes, the first optical axis of said double prism intersecting said test piece and the second optical axis thereof intersecting said focal plane.

3. A photoelectric microscope as defined in claim 2, wherein said objective lens is disposed along said first optical axis of said double prism.

4. A photoelectric microscope as defined in claim 1, wherein said distance measuring means comprises photoelectric detection means, scanning means for effecting a relative movement between photoelectric detection means and said pair of magnified images, and measuring means for measuring the distance of said relative movement effected by said scanning means for the period during which said photoelectric detection means detects said pair of magnified images in succession.

5. A photoelectric microscope as defined in claim 4, wherein said scanning means comprises a slit plate having a pair of longitudinally aligned slits disposed in said focal plane and driving means for reciprocating said slit plate in a direction transverse to said slots.

6. A photoelectric microscope as defined in claim 5, wherein said photoelectric detection means comprises a pair of photoelectric detectors aligned with the respective slots in said slit plate.

7. A photoelectric microscope as defined in claim 5, wherein said driving means comprises an alternating current signal generator, a core member connected to said slit plate and a coil surrounding said core member and connected to the output of said signal generator.

8. A photoelectric microscope as defined in claim 5, further comprising calculating means for determining the extent of deviation of said reference line on said test piece from the optical axis of said optical means in response to the output of said distance measuring means.

9. A photoelectric microscope as defined in claim 8, wherein said calculating means comprises a pulse signal generator, a counter circuit and gate means responsive to the beginning and ending of said period during which said photoelectric detection means detects said pair of magnified images in succession as provided by said distance measuring means for connecting said pulse signal generator to said counter circuit during said period.

10. A photoelectric microscope as defined in claim 9, further comprising a grating mounted on said slit plate for movement therewith and having a plurality of aligned openings therein, a stationary scale mounted in front of said grating and having at least one opening therein, a light source arranged to direct light at said opening in said scale, and a photoelectric detector disposed on the side on said grating opposite said scale and providing an electrical signal which is applied in control of said gate circuit.

11. A method of positioning a test piece having a reference line thereon, comprising the steps of forming a magnified real image of the reference line of said test piece and a point-symmetric image thereof on an identical focal plane by means of an objective and an optical system for making point-symmetric images as disposed in an optical path of said objective, passing the lights of the respective images through two openings provided in a slit plate for scanning said focal plane, introducing the lights passing through the slit plate into two photoelectric transducers disposed behind said respective openings, to convert them into electric signals, detecting the amount of deviation of said test piece from a central optic axis as determined by said objective and said optical system for making point-symmetric images from the relation of the time difference between the generation of said two electric signals.

12. A method of positioning a test piece having a reference line thereon, comprising the steps of forming optical images of said reference line on said test piece as first and second images point-symmetric to each other on an identical focal plane, scanning said images on said focal plane, converting the brightnesses of the respective optical images into electric signals by photoelectric elements and detecting the relative positions between said reference line and an optic axis of said objective as well as the point-symmetry optical system from a distance by which the respective photoelectric elements actually scan while output signals are obtained from said respective photoelectric elements.

* * * * *